Sept. 22, 1970  E. MARTENS  3,529,330
DEVICE FOR INSERTING TRANSVERSE REINFORCING MEMBERS IN
SLABS FORMED BY CONCRETE SLAB EXTRUDING MACHINES
Filed March 6, 1968 8 Sheets-Sheet 1
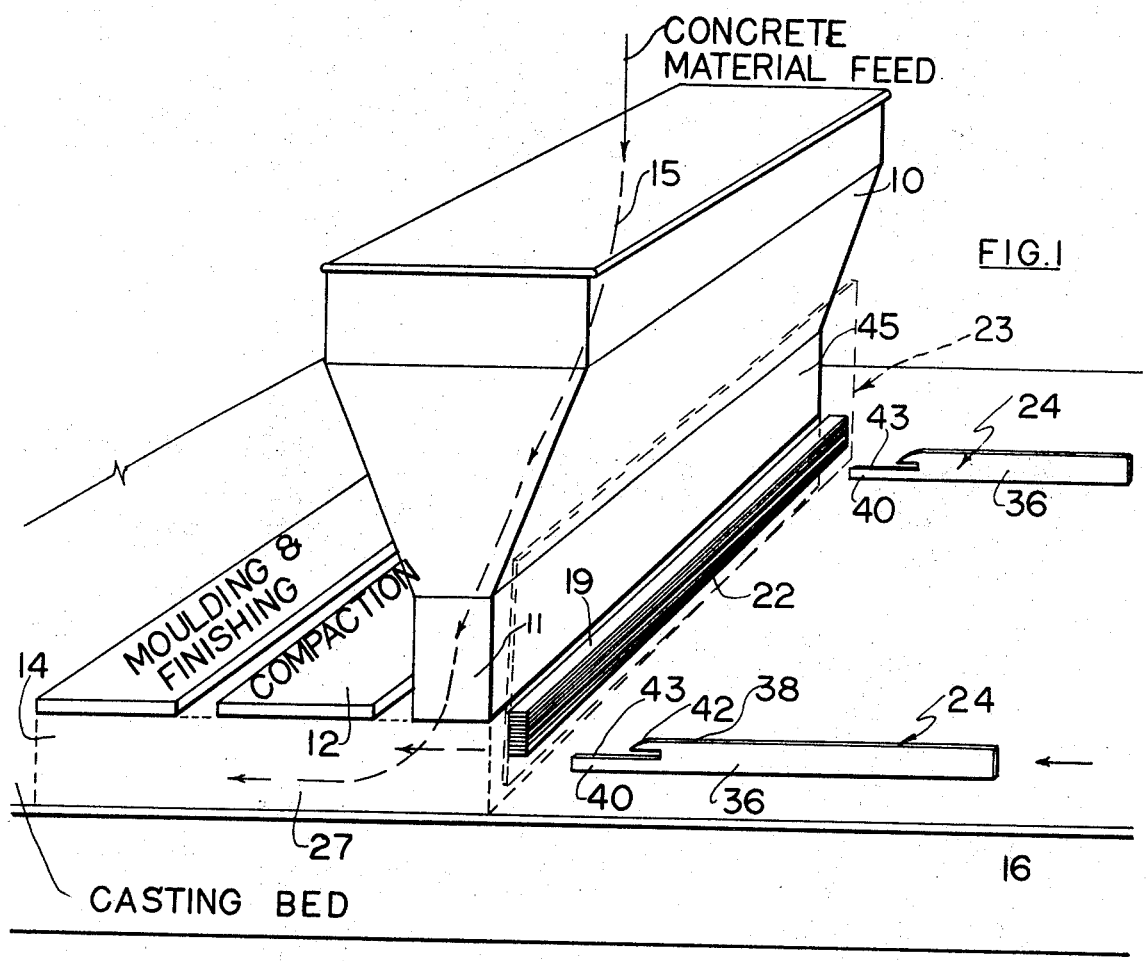
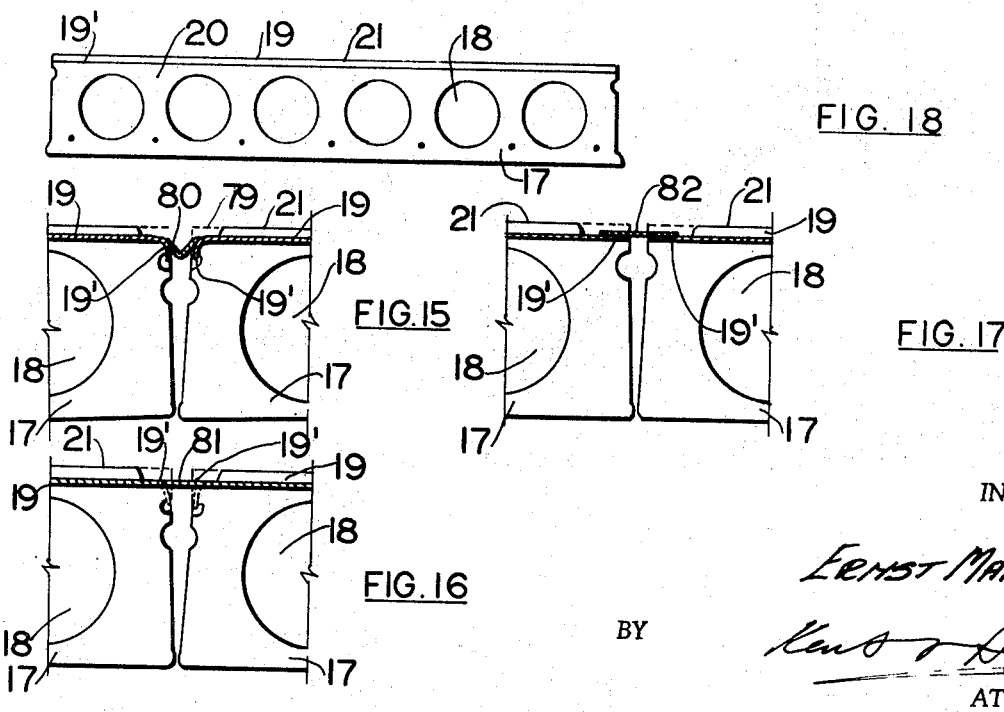
INVENTOR
Ernst Martens
BY
ATTORNEY

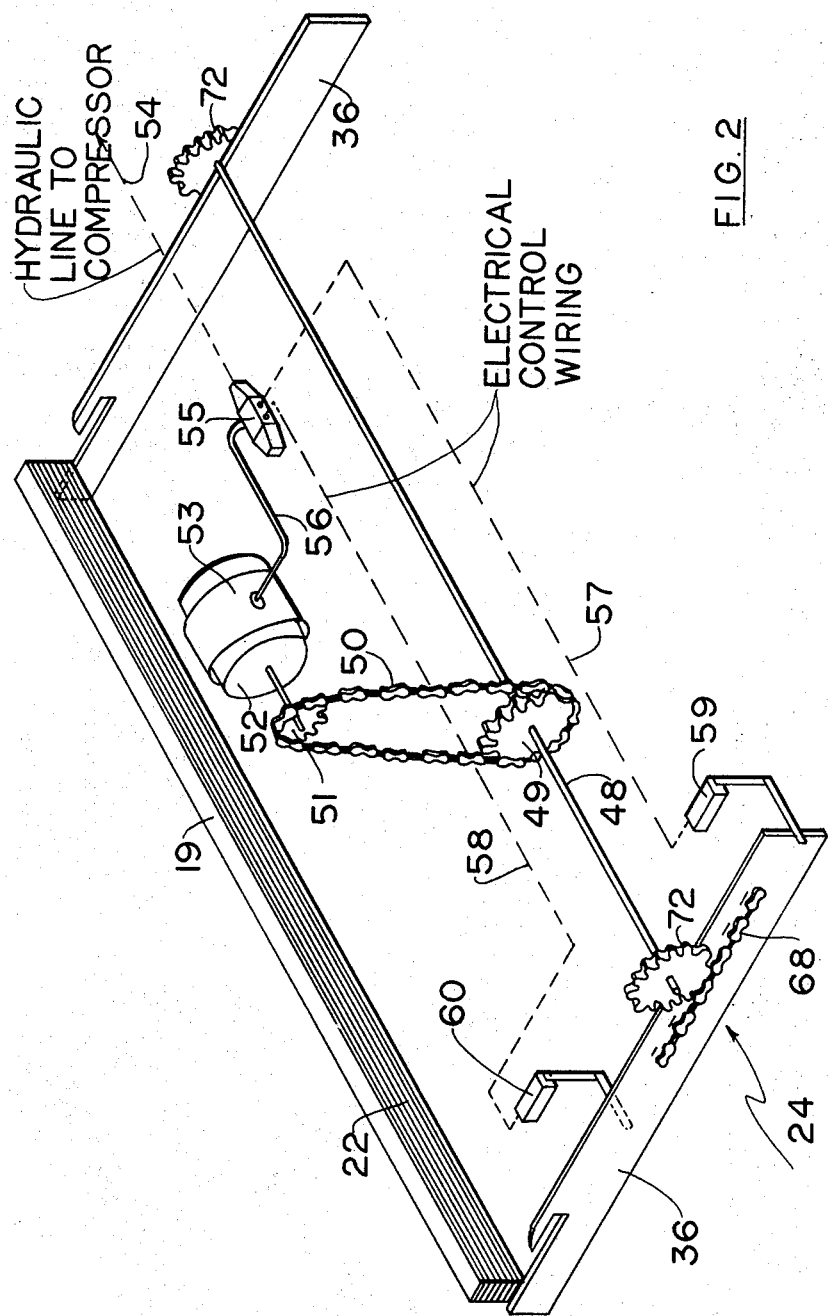

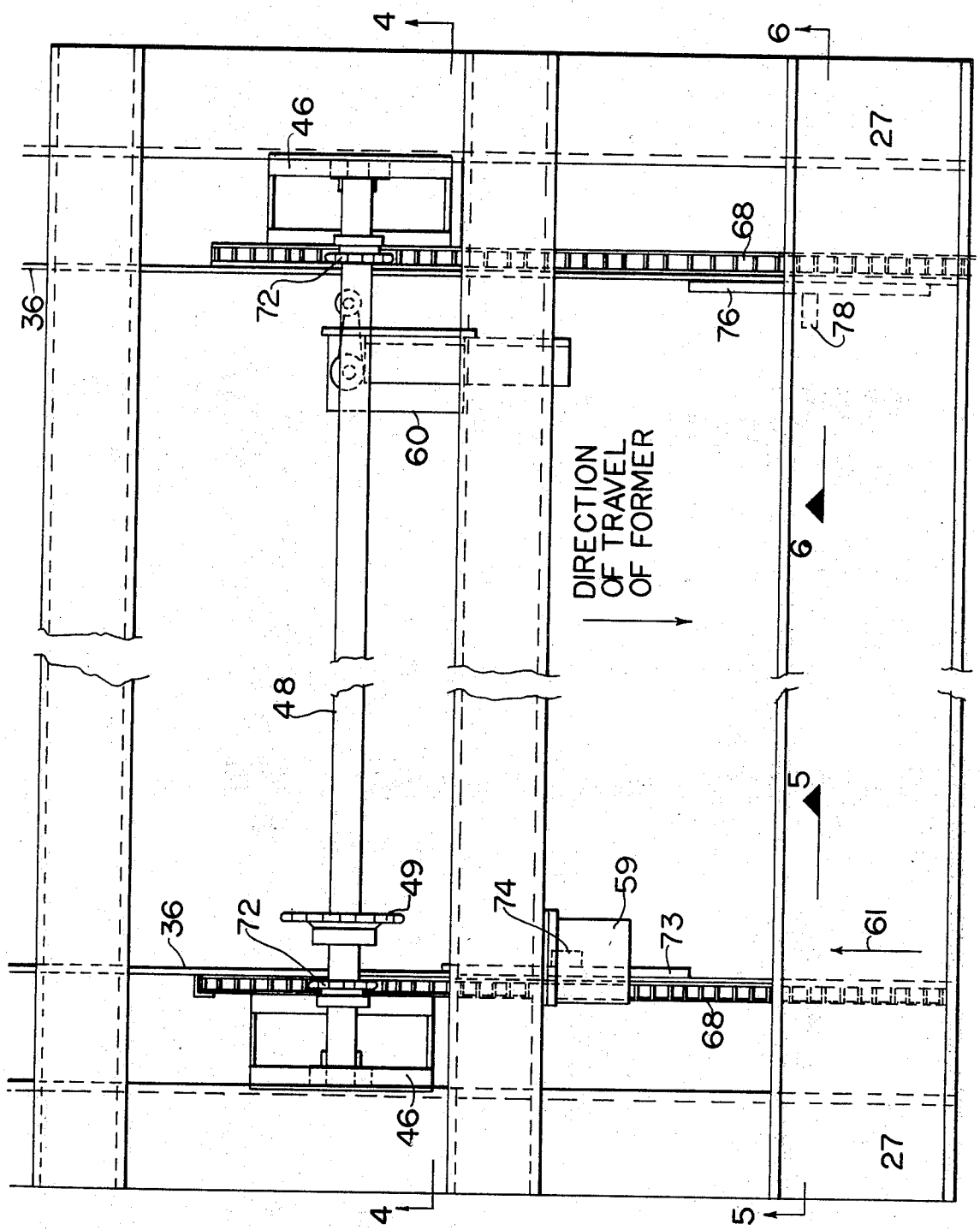

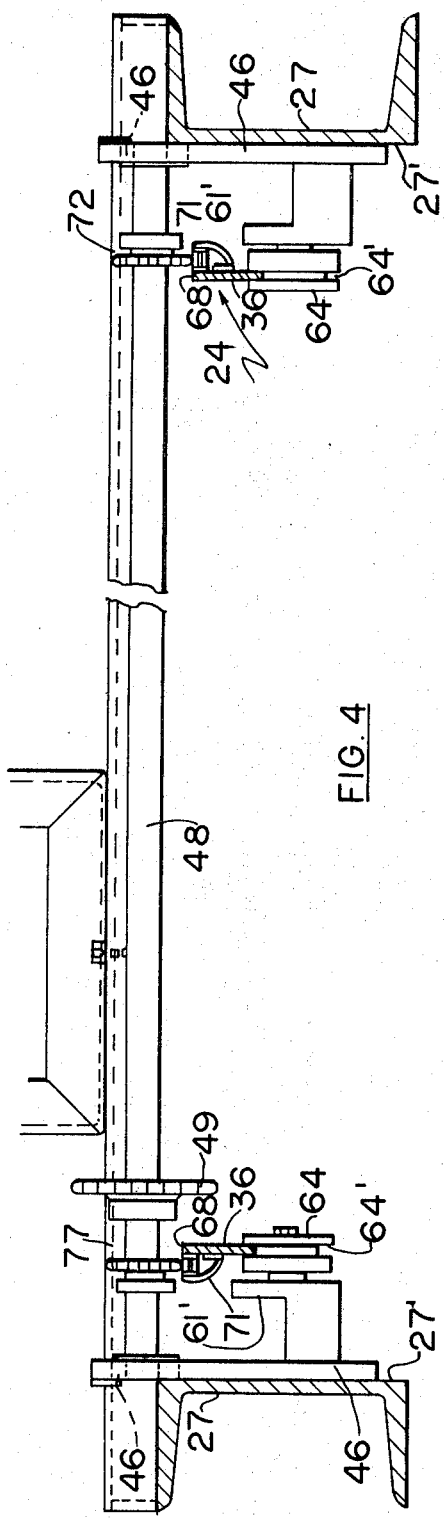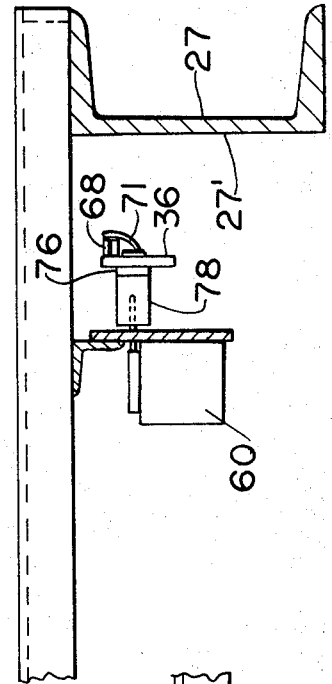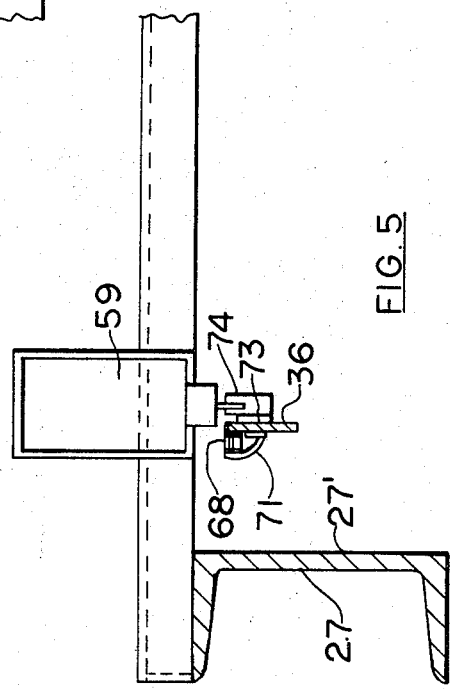

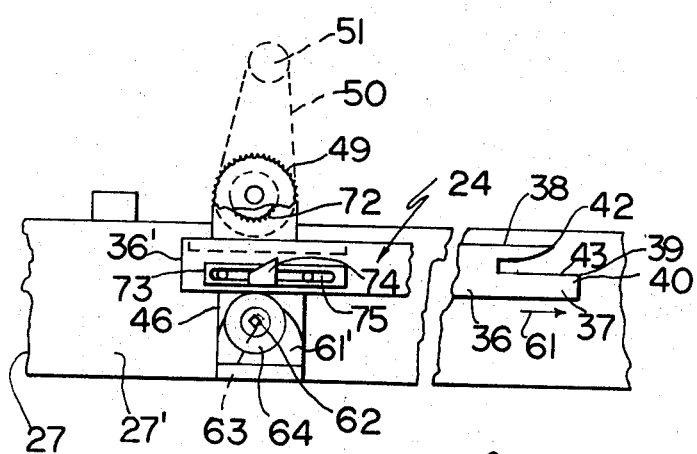
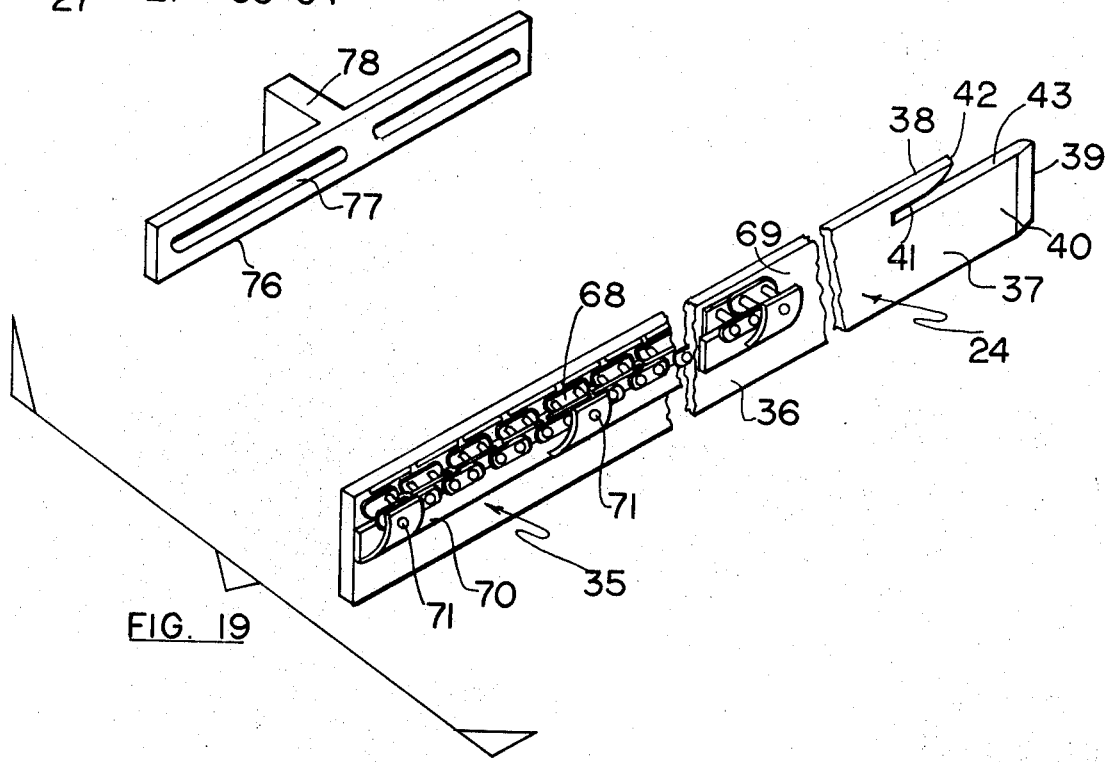

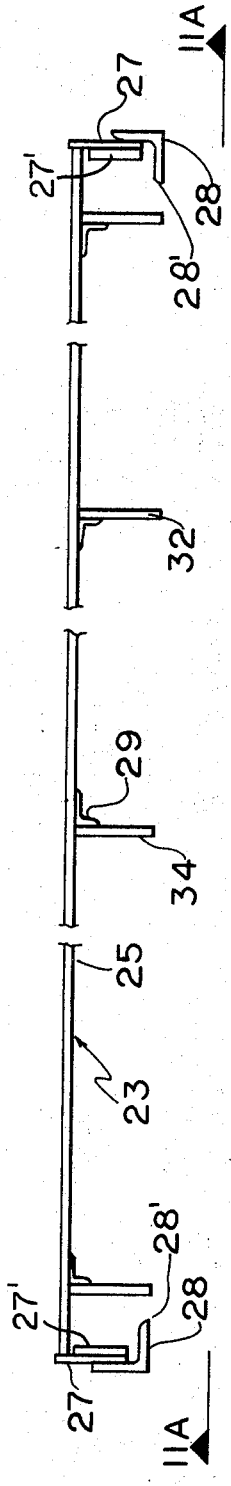
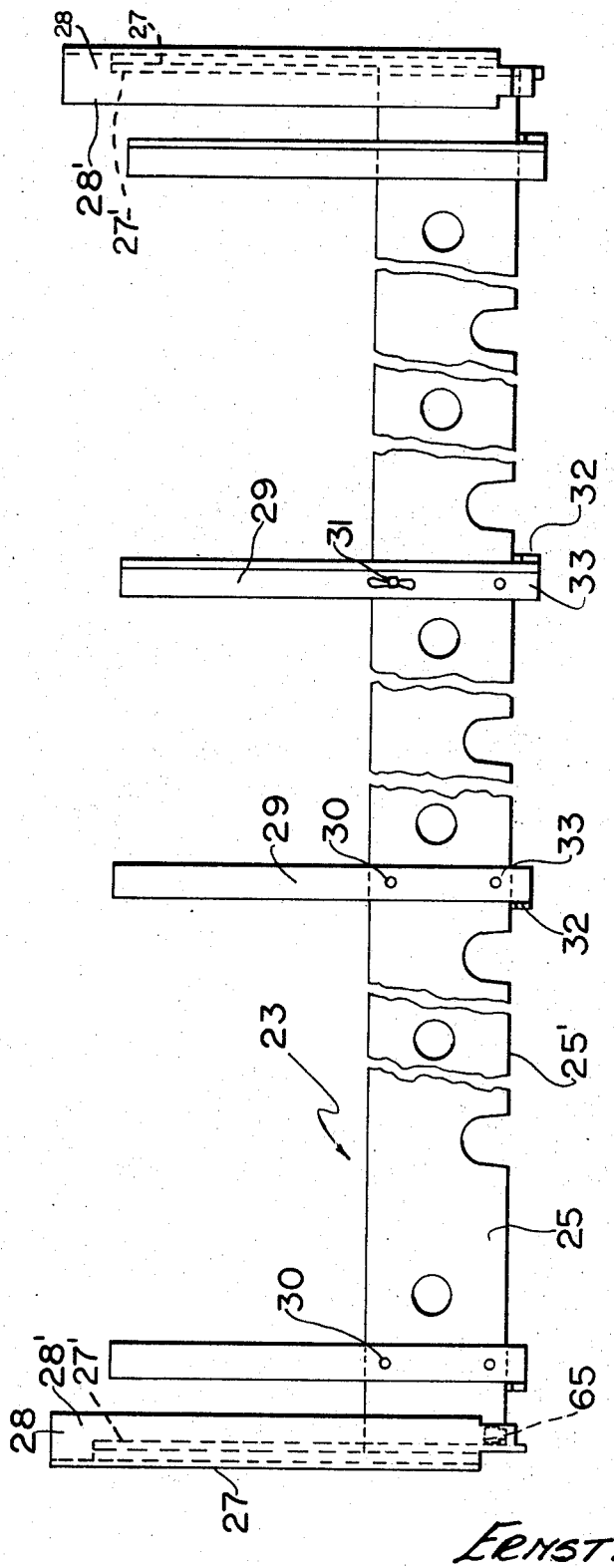

Sept. 22, 1970   E. MARTENS   3,529,330
DEVICE FOR INSERTING TRANSVERSE REINFORCING MEMBERS IN
SLABS FORMED BY CONCRETE SLAB EXTRUDING MACHINES
Filed March 6, 1968   8 Sheets-Sheet 8

INVENTOR
ERNST MARTENS
By Kent & Ade
ATTORNEY

# United States Patent Office 3,529,330
Patented Sept. 22, 1970

3,529,330
DEVICE FOR INSERTING TRANSVERSE REINFORCING MEMBERS IN SLABS FORMED BY CONCRETE SLAB EXTRUDING MACHINES
Ernst Martens, 75 Noble Ave., Winnipeg, Manitoba, Canada
Filed Mar. 6, 1968, Ser. No. 710,939
Claims priority, application Great Britain, Mar. 10, 1967, 11,367/67
U.S. Cl. B28b 23/02
U.S. Cl. 25—41                    15 Claims

ABSTRACT OF THE DISCLOSURE

A magazine is situated at the front of the machine carrying a stack of transverse reinforcing members. A pair of plunger arms are mounted for longitudinal movement below the magazine and operate to pick up one reinforcing member at a time and to move it forwardly through the concrete feeding from the hopper, to a position above the augers and behind the hopper. Withdrawing the arms leaves the reinforcing member in position to have concrete compacted around it so that it is incorporated in the extruded slab above the longitudinal apertures or cores.

---

This invention relates to new and useful improvements in devices for placing reinforcement members transversely in a slab being formed by a slab extruding machine.

The invention is designed primarily to be used with a machine for forming cored concrete slabs similar to that described in Canadian Letters Patent No. 623,476 and United States Letters Patent No. 3,159,897.

In this particular type of machine, the concerete material is fed from a hopper into and around a plurality of augers which compacts the concrete and form the cylindrical apertures. The concrete passes through moulding and finishing sections to be extruded rearwardly from the machine in the form of a substantially rectangular cross section multi-apertured slab.

In this type of machine, the pressure of the compaction urges the machine along the rails which retrudes the concrete slab therebehind.

It is desirable under certain conditions that transverse steel reinforcements be utilized, said reinforcements taking the form of transversely situated flat steel bars placed in select locations in the upport portion of the slabs just above the longitudinally formed cores or apertures.

The transverse steel bars are used to prevent longitudinal splitting in non-uniformly prestressed slabs to reinforce the slab on either side of large openings, to permit positive connection of slabs by welding, to provide transverse reinforcement and hence diaphragm action in areas subject to earthquake tremors, and to connect tongue and groove hollow core wall panels together.

The device permits spaced and parallel transversely situated steel reinforcing bars to be placed in any variety of selected intervals along the slab being formed, operation preferably being by means of hydraulic motor electrically operated.

The transverse bars can be placed by manually pushing a button on the extruder or, alternatively, simple means can be provided along the rails which, when contacted by limit switches, can insert the transverse reinforcing bar at this point.

Another object of the invention is to provide a device of the character herewithin described which is easily incorporated in machines of the class described.

With the foregoing considerations in view, and such other objects, purposes or advantages as may become apparent from consideration of this disclosure and specification, the present invention consists of the inventive concept exhibited in the method, process, construction, arrangement of parts, or new use of any of the foregoing herein particularly exemplified in one or more specific embodiments of such concept, reference being had to the accompanying figures in which:

FIG. 1 is a schematic isometric view of the machine for forming cored slabs, showing the location of the transverse reinforcement attachment.

FIG. 2 is a schematic isometric view of the invention per se.

FIG. 3 is a top plan view of a forward end of a forming machine showing the invention in part thereon.

FIG. 4 is a cross sectional view substantially along the line 4—4 of FIG. 3.

FIG. 5 is a fragmentary section substantially along the line 5—5 of FIG. 3.

FIG. 6 is a fragmentary sectional view substantially along the line 6—6 of FIG. 3.

FIG. 7 is a side sectional view of the device mounted upon one of the longitudinal frame members of the machine.

FIG. 10 is a top plan view of the magazine per se.

FIG. 11 is an elevation substantially along the line 11—11 of FIG. 10.

FIG. 15 is a fragmentary section showing one method of attachment of two beams in side by side relationship.

FIG. 16 is a view similar to FIG. 14 but showing alternative means.

FIG. 17 is a view similar to FIG. 15 but showing a yet further alternative means.

FIG. 18 is a section of a slab showing the reinforcing members in position.

FIG. 19 is aside elevation of the plunger per se.

In the drawings like characters of reference indicate corresponding parts in the different figures.

Figure 8:
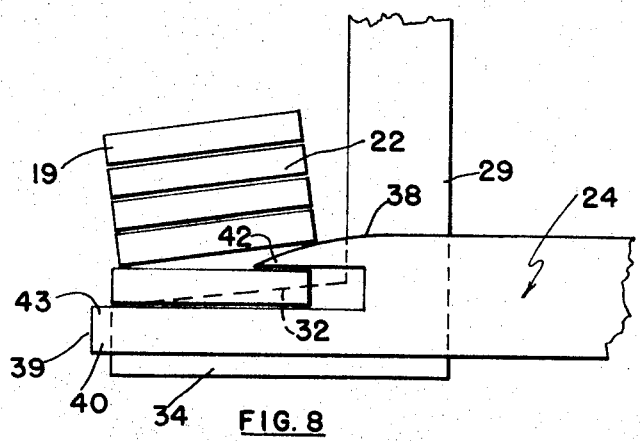
FIG. 8 is an enlarged fragmentary side view showing the plunger end engaging a reinforcing strip.

Proceeding therefore to describe the invention in detail, reference should first be made to FIGS. 1 and 2 in which 10 illustrates a hopper holding prepared concrete material which feeds downwardly through the base 11 into the compaction compartment 12 which contains a plurality of augers 13 (see FIGS. 12, 13 and 14) which compact the concrete. This compaction due to the rotation of the augers 13, drive the machine forwardly on a pair of rails (not illustrated) thus retruding the finished concrete slab through the moulding and finishing section 14, all of which is described and illustrated in the aforementioned patents. The direction of the flow of concrete is illustrated by the arrowed line 15.

Figure 12:
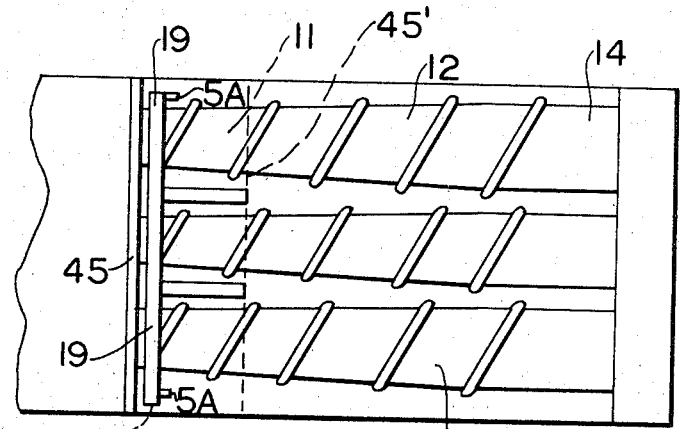
FIG. 12 is a top plan view partially schematic of the machine with the hopper and chambers removed showing the plungers about to pick up a reinforcing strip.
Figure 13:
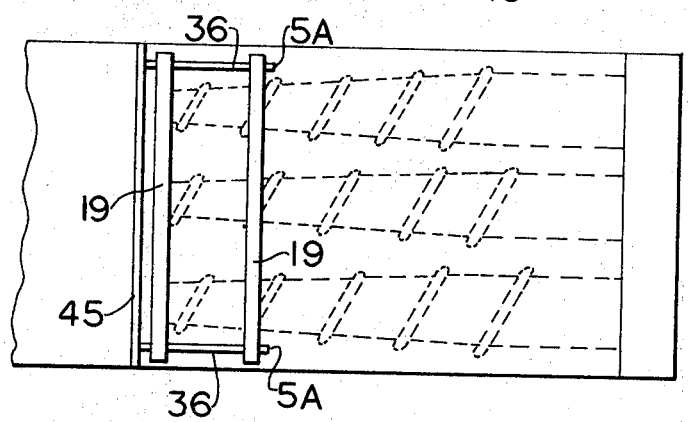
FIG. 13 is a view similar to FIG. 12 but showing the reinforcing strip being moved rearwardly.
Figure 14:
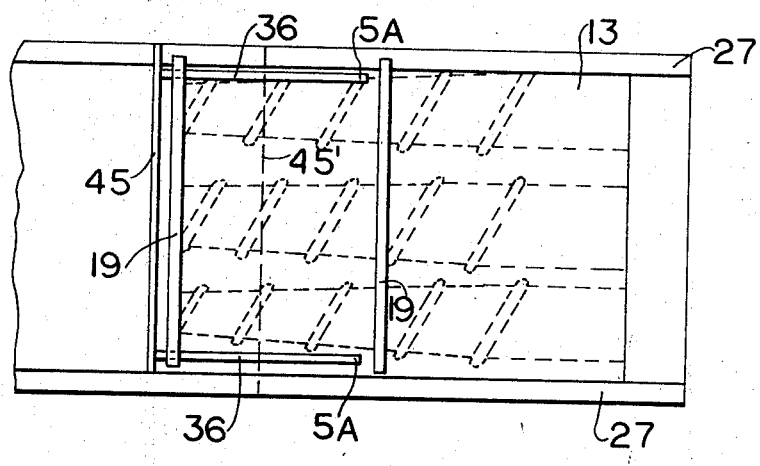
FIG. 14 is a view similar to FIG. 12 but showing the reinforcing strip in position with the plungers withdrawing.

It is normal for the machine to be mounted upon the aforementioned rails which span a bed plate 16 and a device having between two and eight augers 13 as shown for six augers in FIGS. 12, 13 and 14, produces a slab having a cross section illustrated in FIG. 18 and identified by the reference character 17. Reference character 18 illustrates the cores or longitudinally extending apertures formed by the action of the augers as aforesaid.

The present invention is concerned with the insertion of transverse reinforcing strips of steel 19 in spaced and parallel relationship within the upper portion 20 of the slab above the apertures 18 and below the upper surface 21 of the slab. These strips are substantially rectangular when viewed in cross section and may be ⅛ of an inch or ³⁄₁₆ of an inch thick as desired.

FIG. 1 shows a pile of these strips at 22 situated within a rack or magazine collectively designated 23 (FIG. 9), the reinforcing strips 19 being fed downwardly by gravity and being picked up and engaged by a plunger assembly collectively designated 24 and moved rearwardly one at a time, by the plunger assemblies, under the hopper and into the compaction chamber to be situated above the augers as shown clearly in FIGS. 6, 7 and 8.

Figure 9:
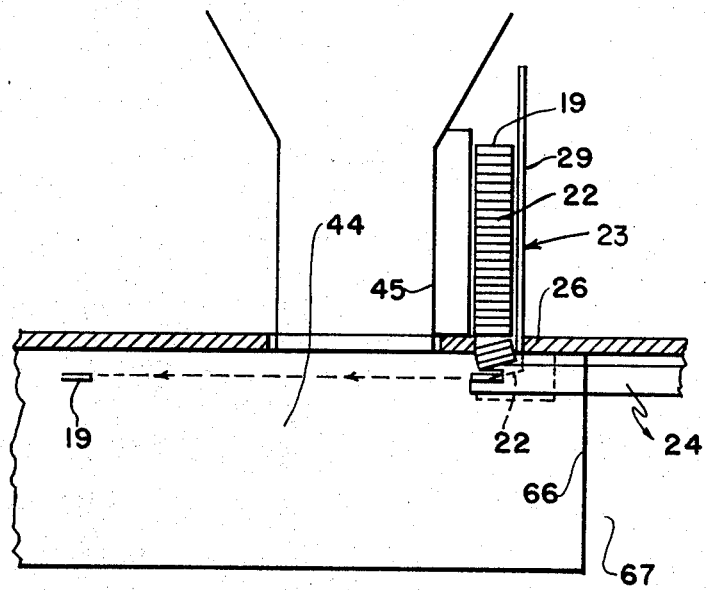
FIG. 9 is a fragmentary partially sectioned view showing the plunger end in relation to the magazine.

In detail, reference should be made to FIGS. 9, 10 and 11 which show the construction of the rack or magazine 23.

A transversely situated strip or plate 25 is situated vertically and rests upon the upper surface 26 of the machine between the pair of spaced and parallel longitudinal side frame members 27 which form the part of the frame of the machine.

Secured by welding at each end of this strip or plate 25 is a width spacer assembly 27' extending upwardly and secured in turn to this spacer assembly 27' is a rear angle iron member 28. These two angle iron members act as the rear retainers for the plurality of reinforcing strips 19 mounted vertically within the magazine.

The front retainers take the form of angle iron members 29 secured to the vertically situated strip or plate 25 and extending upwardly therefrom as clearly shown in the drawings. In the present embodiment, there are four such members but the number can be varied to suit conditions.

These members 29 are mounted to the plate by bolts 30 which engage vertically situated slots 31 in the members 29 to allow limited vertical adjustment.

The members 29 are also provided with reinforcing strip retainers 32 which consist of horizontal strips welded to the lower ends 33 of the member 29 and extend at right angles therefrom towards the plane of the rear flanges 28' of the rear retainer members 28. The upper surface 34 of these retainers slopes downwardly slightly from members 29 towards the plane of the flanges 28'.

The plurality of reinforcing strips 19 (collectively designated 22) are retained within this magazine due to the flanges 28' and the members 29, the lowermost one resting upon the upper surfaces 34 of the portions 32, it being noted that the portions 32 and the lower ends 33 of members 29 are secured so that these lower ends are below the lower end 28' of the angle 28 thus permitting sufficient clearance, below this lower end, for the movement of the lowermost reinforcing strip 19 as will hereinafter be described.

Situated forwardly of the magazine 23 and mounted between the side members 27 is a pair of plunger assemblies collectively designated 35, there being one upon each of the side members 27 and secured to the inner surfaces 27' of these members.

Each plunger assembly consists of a plunger 36 which in turn consists of a steel strip situated on edge as clearly shown in the drawings.

Means are provided to move these strips forwardly and rearwardly and the reinforcing strip engaging ends 37 of the plungers are shown in detail in FIG. 7. These ends 37 include an upper flange portion 38 which terminates short of the extreme distal end 39 of the main portion 40 and also defines an open sided slot 41 between the flange 38 and the portion 40. The end 42 of the flange 38 is edge sharped and it is this end 42 which acts as a separator between the lowermost reinforcing strip 19 and the one immediately thereabove within the magazine 23.

These strips are mounted for forward and rearward movement, in a position so that the portion 42 engages between the lowermost reinforcing strip 19 and the one immediately thereabove, said lowermost strip being engaged by the surface or upper edge 43 of the portion 40.

The reinforcing strip is moved into the slot 41 which carries it forwardly under the base 44 of the hopper and into the compaction chamber 12.

Reference to FIGS. 12, 13 and 14 show the reinforcing strip in FIG. 12, in the position defined by the magazine and forwardly of the front edge or wall 45 of the hopper, just being picked up by the plungers 36.

Further rearward movement of the plungers 36 takes the reinforcing strip 19 to the position shown in FIG. 13 continuing until the plungers 36 are in the fully extended position at which time the strip 19 is in the position shown in FIG. 14 and the plungers are being withdrawn in order to be in position to pick up the next reinforcing strip.

At this point concrete is being compacted by the augers within the compaction chamber so that when the machine moves away from this portion of the slab, the strip takes the position shown in FIG. 18 with reference to the completed slab.

The plungers 36 are mounted within brackets 46 which are bolted to the aforementioned inner surfaces 27' of the side members 27. These brackets include bearings 47 within the upper ends thereof and a shaft 48 is journalled for rotation within these bearings. A sprocket wheel 49 is secured to the shaft and chain 50 extends around this sprocket and around a further sprocket 51 which is secured to a shaft 52 operated by an hydraulic motor 53 (see FIG. 2). A source of hydraulic pressure (not illustrated) is provided through hydraulic line 54 to a reversing and control valve assembly 55 which is conventional. A further conduit 56 extends between the valve and the hydraulic motor 53 and electrical conduits 57 and 58 extend to limit switches 59 and 60 respectively which are mounted upon the supporting structure as will hereinafter be described.

Briefly, however, the rearward movement of the plungers in the direction of arrows 61 is initiated by a manually operated push button or any other method which may be suitable. However, as such details are conventional, they have not been illustrated in the enclosed drawings.

When the plunger reaches the rearward most position (see FIG. 14), limit switch 60 is actuated by means on the plunger and this operates the control valve 55 which reverses the direction of motor 53. The forward stroke then takes place and stops when limit switch 59 is operated by the plunger. This limit switch again operates the control valve 55 which stops the motor 53 until further action is initiated either by a manually operated push button or other means as hereinbefore mentioned.

An offstanding portion 61' is formed on bracket 46 and bolts 62 support bearings 63 on this portion 61'. A grooved wheel or pulley 64 is secured around the bearing 63 and rotates upon this bearing as shown in the FIG. 4.

The aforementioned plunger 36 engages the groove 64' within this wheel 64 by the lower edge 36' thereof as the plunger reciprocates.

The rearward end of the plunger is supported by firstly, a cutaway portion or notch 65 formed in the underside 25' of the strip or plate 25 (see FIG. 11). The rearward ends also pass through slots formed in the rear bulkhead 66 of the auger support portion 67.

Means are provided to operatively connect the drive from shaft 48 to the plungers 36, said means taking the form of a length of chain 68 (see FIG. 19) secured to the forward outer side 69 of the plunger 36. A strip 70 is secured to the side of the plunger and the chain rests upon the strip and is engaged by outwardly and upwardly curving brackets 71 which extend upwardly from the strip 70 and embrace the chain as clearly shown.

The chain may be anchored by pins (not illustrated) or welding as desired.

Sprockets 72 are keyed to shaft 48 and are rotated thereby and these sprockets engage the upper sides of the chain lengths 68 thus driving the plungers forwardly and rearwardly as the shaft is rotated in one direction or the other by the hydraulic motor 53.

This is shown schematically in FIG. 2.

Secured to one of the plungers upon the one side thereof is a slotted strip 73 having a cam 74 adjustably mounted for movement along the slot 75 within the strip. This cam engages the aforementioned limit switch 59 and operates same when the plungers are at their forward position. This limit switch stops the hydraulic motor 53 as hereinbefore described.

Mounted upon the other plunger is a further strip 76 also slotted as at 77 for limited adjustment. This is mounted upon the opposite plunger 36 and is shown in FIG. 19 in the exploded position.

This strip 76 is provided with an actuator 78 extending at right angles to the strip. This actuator is adapted to be operate limit switch 60 and reverses motor 53.

In operation, the magazine 23 is loaded with the reinforcing strip 19 and the slab forming machine is actuated.

Whenever it is desired to insert a transverse reinforcing strip 19, the hydraulic motor 53 is actuated thus driving the plungers 36 in the direction of arrows 61. These pick up the lowermost reinforcing strip 19 and insert into the compaction chamber into the position shown in FIG. 14. The limit switch 60 is operated by the portion 78 thus reversing the action of the plungers which then withdraw and actuate limit switch 59 which switches off the hydraulic motor 53. In this position the plungers are in the position to pick up the next reinforcing strip from the magazine 23.

As the slab is extruded rearwardly of the machine, the concrete is scraped off the ends 19' of the reinforcing strips, leaving the area shown in phantom in FIGS. 15 and 16 and 18, and identified by the references character 79.

Adjacent slabs may be connected together when installed, by one of the methods shown in FIGS. 15, 16 and 18.

In FIG. 15, these ends 19' are bent downwardly at right angles whereupon an angle fillet 80 is placed in position as shown and welded.

Alternatively, the ends 19' may be welded together to form a butt welded as shown by reference character 81 in FIG. 16, after the bent ends are straightened.

FIG. 18 shows a still further embodiment in which the end 19' are left in the planar position and join with a flat overlapping plate 82 which in turn is fillet welded to these ends.

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

What is claimed to be the present invention is:

1. In a cored slab extruding machine which includes a hopper for concrete, a compacting chamber behind the hopper, a plurality of augers extending through the compacting chamber for compacting and extruding the slab, and for forming the longitudinal cores or bores therein, a source of power, and a pair of longitudinal side frame members; a device for placing spaced and parallel transverse reinforcing members in the upper portion of the slab being formed, said device comprising in combination a magazine situated behind the hopper of said machine for holding a plurality of transverse reinforcing members, and at least one plunger assembly on said machine, means on said plunger assembly for engaging and picking up reinforcing members one at a time from said magazine, and means operatively connecting said plunger assembly to said source of power for moving said plunger assembly forwardly under the hopper thereby depositing said reinforcing members rearwardly of said hopper and within the concrete forming said slab.

2. The device according to claim 1 in which said means operatively connecting said plunger assembly to said source of power includes a transverse shaft, means bearably supporting said transverse shaft between said longitudinal side frame members, means connecting said shaft for rotation to said source of power, said plunger assembly including rack means thereon, said shaft including gear means thereon rotated by said shaft and engaging said rack means, and roller means below said shaft mounting said plunger for fore and aft movement.

3. The device according to claim 2 in which said means operatively connecting said source of power to said plunger assembly includes a bracket secured to each of said longitudinal side frame members, said shaft being journalled for rotation within said brackets, said rollers being journalled for rotation also in said brackets but below said shaft, said rack means being adjacent the upper side of said plunger, said gear means engaging the upper side of said rack thereby mounting said rack for longitudinal movement between said gear means and said roller.

4. The device according to claim 1 in which said plunger assembly includes a plunger member, the engaging end of said plunger member including an upper flange terminating spaced from said engaging end, said flange and said end defining a longitudinally extending open sided slot adapted to engage a reinforcing member, the end of said flange being wedge shaped to separate the lowermost reinforcing member in said magazine from the reinforcing member immediately thereabove.

5. The device according to claim 2 in which said plunger assembly includes a plunger member, the engaging end of said plunger member including an upper flange terminating spaced from said engaging end, said flange and said end defining a longitudinally extending open sided slot adapted to engage a reinforcing member, the end of said flange being wedge shaped to separate the lowermost reinforcing member in said magazine from the reinforcing member immediately thereabove.

6. The device according to claim 3 in which said plunger assembly includes a plunger member, the engaging end of said plunger member including an upper flange terminating spaced from said engaging end, said flange and said end defining a longitudinally extending open sided slot adapted to engage a reinforcing member, the end of said flange being wedge shaped to separate the lowermost reinforcing member in said magazine from the reinforcing member immediately thereabove.

7. The device according to claim 1 in which said magazine includes a plurality of vertically extending rear members and a plurality of vertically extending front members, said members being in spaced apart relationship thereby defining a reinforcing strip receiving magazine, said front members being secured to a strip, said transverse strip having guide slots therein within which the plungers of said plunger assemblies are supported for lengthwise movement, reinforcing strip support fingers secured to the lower ends of said front members situated below the lower edge of said strip, the upper surfaces of said fingers inclining downwardly and rearwardly from said front members towards said rear members.

8. The device according to claim 2 in which said magazine includes a plurality of vertically extending rear members and a plurality of vertically extending front members, said members being in spaced apart relationship thereby defining a reinforcing strip receiving magazine, said front members being secured to a strip, said transverse strip having guide slots therein within which the plungers of said plunger assemblies are supported for lengthwise movement, reinforcing strip support fingers secured to the lower ends of said front members situated below the lower edge of said strip, the upper surfaces of said fingers inclining downwardly and rearwardly from said front members towards said rear members.

9. The device according to claim 3 in which said magazine includes a plurality of vertically extending rear members and a plurality of vertically extending front members, said members being in spaced apart relationship thereby defining a reinforcing strip receiving magazine, said front members being secured to a strop, said transverse strip having guide slots therein within which the plungers of said plunger assemblies are supported for lengthwise movement, reinforcing strip support fingers secured to the lower ends of said front members situated below the lower edge of said strip, the upper surfaces of said fingers inclining downwardly and rearwardly from said front members towards said rear members.

10. The device according to claim 4 in which said magazine includes a plurality of vertically extending rear members and a plurality of vertically extending front members, said members being in spaced apart relationship thereby defining a reinforcing strip receiving magazine, said front members being secured to a strip, said transverse strip having guide slots therein within which the plungers of said plunger assemblies are supported for lengthwise movement, reinforcing strip support fingers secured to the lower ends of said front members situated below the lower edge of said strip, the upper surfaces of said fingers inclining downwardly and rearwardly from said front members towards said rear members.

11. The device according to claim 5 in which said magazine includes a plurality of vertically extending rear members and a plurality of vertically extending front members, said members being in spaced apart relationship thereby defining a reinforcing strip receiving magazine, said front members being secured to a strip, said transverse strip having guide slots therein within which the plungers of said plunger assemblies are supported for lengthwise movement, reinforcing strip support fingers secured to the lower ends of said front members situated below the lower edge of said strip, the upper surfaces of said fingers inclining downwardly and rearwardly from said front members towards said rear members.

12. The device according to claim 6 in which said magazine includes a plurality of vertically extending rear members and a plurality of vertically extending front members, said members being in spaced apart relationship thereby defining a reinforcing strip receiving magazine, said front members being secured to a strip, said transverse strip having guide slots therein, within which the plungers of said plunger assemblies are supported for lengthwise movement, reinforcing strip support fingers secured to the lower ends of said front members situated below the lower edge of said strip, the upper surfaces of said fingers inclining downwardly and rearwardly from said front members towards said rear members.

13. The device according to claim 3 in which said rack means includes a length of chain, means to secure said length of chain to said plunger, said last mentioned means including a strip secured to the side of said plunger and supporting the underside of said chain, and a plurality of outwardly and upwardly curved brackets extending upwardly from said strip and engaging the sides of said chain.

14. The device according to claim 6 in which said rack means includes a length of chain, means to secure said length of chain to said plunger, said last mentioned means including a strip secured to the side of said plunger and supporting the underside of said chain, and a plurality of outwardly and upwardly curved brackets extending upwardly from said strip and engaging the sides of said chain.

15. The device according to claim 9 in which said rack means includes a length of chain, means to secure said length of chain to said plunger, said last mentioned means including a strip secured to the side of said plunger and supporting the underside of said chain, and a plurality of outwardly and upwardly curved brackets extending upwardly from said strip and engaging the sides of said chain.

References Cited
UNITED STATES PATENTS

| | | | |
|---|---|---|---|
| 1,527,674 | 2/1925 | Davis. | |
| 3,089,214 | 5/1963 | Wolff | 25—121 X |
| 3,143,781 | 9/1964 | Kalns | 25—32 X |
| 3,159,897 | 12/1964 | Ellis | 25—14 X |

J. SPENCER OVERHOLSER, Primary Examiner

B. D. TOBOR, Assistant Examiner

U.S. Cl. X.R.

25—14, 103; 221—268